(12) United States Patent
Moldenhauer et al.

(10) Patent No.: US 6,901,397 B1
(45) Date of Patent: May 31, 2005

(54) METHOD AND APPARATUS FOR PROVIDING WEB-BASED ASSISTANCE TO CUSTOMERS AND SERVICE REPRESENTATIVES

(75) Inventors: Tina L. Moldenhauer, Haslet, TX (US); Melissa Magos, O'Fallon, MO (US); Greg Gordy, Warrenton, MO (US)

(73) Assignee: GTE Service Corporation, Irving, TX (US)

( * ) Notice: Subject to any disclaimer, the term of this patent is extended or adjusted under 35 U.S.C. 154(b) by 906 days.

(21) Appl. No.: 09/245,776

(22) Filed: Feb. 5, 1999

(51) Int. Cl.[7] ............................................. G06F 17/30
(52) U.S. Cl. ........................... 707/3; 345/700; 705/26
(58) Field of Search ............................... 345/336, 352, 345/349, 967, 970, 327, 328; 707/3; 705/26; 348/1–10

(56) References Cited

U.S. PATENT DOCUMENTS

| | | | | |
|---|---|---|---|---|
| 5,517,257 A | * | 5/1996 | Dunn et al. | 348/734 |
| 5,689,663 A | * | 11/1997 | Williams et al. | 395/327 |
| 5,796,807 A | * | 8/1998 | Costello et al. | 379/67 |
| 5,825,361 A | * | 10/1998 | Rubin et al. | 345/349 |
| 5,880,974 A | * | 3/1999 | Tarumi et al. | 364/578 |
| 5,903,266 A | * | 5/1999 | Berstis et al. | 345/338 |
| 5,918,213 A | * | 6/1999 | Bernard et al. | 705/26 |
| 5,974,388 A | * | 10/1999 | Durham | 705/1 |
| 5,991,739 A | * | 11/1999 | Cupps et al. | 705/26 |
| 6,026,377 A | * | 2/2000 | Burke | 705/27 |
| 6,034,687 A | * | 3/2000 | Taylor et al. | 345/351 |
| 6,067,084 A | * | 5/2000 | Fado et al. | 345/326 |
| 6,091,413 A | * | 7/2000 | Takeuchi et al. | 345/336 |

* cited by examiner

*Primary Examiner*—Srirama Channavajjala
*Assistant Examiner*—Khanh Pham
(74) *Attorney, Agent, or Firm*—Leonard C. Suchtya, Esq.; Joel Wall, Esq.; Rader, Fishman & Grauer PLLC

(57) ABSTRACT

A web-based application is used to assist customer service representatives or others answer questions about various items such as electronic equipment. The application provides the user with an interface with links to additional pages of information. In one embodiment, the application can be configured to allow the user to answer questions about DSS satellite television systems, including installation, operation and programming information. The web-based application provides information to the user as well as interactive displays that simulate the actual operation of the unit under investigation. The displays can be rotated to assist the user in visualizing the unit under investigation and dialog boxes can be nested to appear when specific portions of a display are selected. For example, the display of a decoder box could be rotated and functional keys selected to obtain additional information about their function.

19 Claims, 22 Drawing Sheets

ORDER ENTRY FORM

| Order Entry Form - Step 1 of 4 | | | |
|---|---|---|---|
| Sales Rep Name | | Cust First Name | |
| Sales Rep ID | | Cust M.I. | |
| 800# | | Cust Last Name | |
| Sales Rep Type | Q - CCA CONVERGYS ▾ | Cust Zip Code | |
| Sales Reason | N - CONVERGYS ▾ | State | Arizona ▾ |
| Campaign Code | A - PHONEMART ▾ | | |
| << Back | Back to JobAids | | Next >> |

520 — Cust First Name, Cust M.I. (top right group)
522 — Cust Last Name, Cust Zip Code, State (lower right group)
524 — Sales Rep Name, Sales Rep ID, 800#, Sales Rep Type, Sales Reason, Campaign Code (left group)
518

*FIG. 5A*

ORDER ENTRY FORM

Smart Order Form

| | |
|---|---|
| On how many TVs do you want programming? | 1 ▼ |
| On how many TVs do you want different programming? | 1 ▼ |
| How do you receive programming now? | Cable ▼ |
| Approximate distance from the broadcast... | 00-30 miles ▼ |
| ...se or lease? | Purchase ▼ |
| Do you have children? | None ▼ |
| Do you enjoy sports? | |
| Do you rent many movies? | Yes ▼ |

Microsoft Internet Explorer ⚠ This address is Fully Serviceable [OK]

[<< Back] [Main] [Next >>]

*FIG. 5B*

ORDER ENTRY FORM

| Smart Order Form | | | |
|---|---|---|---|
| On how many TVs do you want programming? | 4 ▾ | How do you receive programming now? | Antenna ▾ |
| On how many TVs do you want different programming? | 2 ▾ | Approximate distance from the broadcast stations? | 30-50 miles ▾ |
| Do you have children? | No ▾ | Do you want to purchase or lease? | Purchase ▾ |
| Do you enjoy sports? | Yes ▾ | Brand Preference? | Sony ▾ |
| Do you enjoy movies? | Yes ▾ | Professional Installation? | Yes ▾ |
| Do you rent many movies? | Yes ▾ | | |
| << Back | Back to JobAids | | Next >> |

*FIG. 5C*

ORDER ENTRY FORM

| Equipment | | | | Programming | | |
|---|---|---|---|---|---|---|
| Description | # | Price | Total | Description | | Price |
| Sony Dual LNB System | 1 | 399.99 | 399.99 | Entertainment Unlimited - 1 Free Month | | 0.00 |
| Sony Extra Receiver | 1 | 279.99 | 279.99 | TV Guide - 4 Free Issues | | 0.00 |
| | | SubTotal | $679.98 | Total Choice Platinum | | 47.99 |
| | | Tax | $49.30 | | SubTotal | $47.99 |
| | | Total | $729.28 | | Tax | $3.00 |
| Accessories | | | | | Total | $50.99 |
| Description | # | Price | Total | Rental Equipment | | |
| Surge Protector | 1 | 29.99 | 29.99 | Description | # | Price | Total |
| Antenna - Suburban | 1 | 59.99 | 59.99 | | | SubTotal | $0.00 |
| | | SubTotal | $89.98 | | | Tax | $0.00 |
| | | Tax | $6.52 | | | Total | $0.00 |
| | | Total | $96.50 | SEE Magazine | | |
| Installation | | | | Description | | Price |
| Description | # | Price | Total | | SubTotal | $0.00 |
| BasicInstallation | 1 | 199.00 | 199.00 | | Tax | $0.00 |
| Additional TV Hookup | 2 | 50.00 | 100.00 | | Total | $0.00 |
| Off-Air Antenna Installation | 2 | 129.99 | 259.98 | Sports Packages | | |
| Additional Receiver Hookup | 1 | 80.00 | 80.00 | No Sports Packages | | |
| Basic Install - Promo | 1 | 100.00 | -100.00 | Installment Billing | | |
| | | SubTotal | $538.98 | | | |
| | | Tax | $39.08 | | | |
| | | Total | $578.06 | | | |
| | | Grand Total | $1,403.84 | | | |

| Payment Type |
|---|
| ⦿ Cash    ○ Check    ○ Credit Card |
| Payment Amount and Additional Comments |

FIG. 5D

PHONE MART INFORMATION

Zip code not found. Displaying closest match.

| Street Address | Denton Phone Mart<br>2219 S. Loop 288, Suite 108<br>Denton, TX 76205 |
|---|---|
| Location | I-35 coming from Dallas, exit McKinney or Loop 288, turn right at the light. Take an immediate right into shopping center by Burger King. The store is located between Jason's Deli and CiCi's Pizza |
| Customer Phone | (940) 243-0529 |
| Fax Number | (940) 387-1632 |
| Store Hours | M-F: 9:00-7:00, Sat: 9:00-5:00 |

| Store Number | DBS Fixture | # of TVs | 2nd TV Hookup | Sales ID # |
|---|---|---|---|---|
| P-7107 | 1 | 2 | Local antenna | 402 |

Back to the Form

Employee information

FIG. 6B

DIRECTV & USSB
Programming Lineup
General Interest

Back to the Programming Main Page

| | DirecTV Programming - Blue | | USSB Programming - Red | |
|---|---|---|---|---|
| A&E | A & E (Arts and Entertainment) | 240 | HGTV | HGTV (Home & Garden Television) | 214 |
| BET | BET (Black Entertainment Television) | 268 | HSN | Home Shopping Network | 213 |
| Bravo | Bravo | 238 | Lifetime | Lifetime | 252 |
| Comedy Central | Comedy Central | 255 | QVC | QVC | 261 |
| E! | E! Entertainment Television | 217 | TBS | Superstation TBS | 259 |
| Food | The Food Network | 215 | WGN | Superstation WGN | 256 |
| GAME SHOW | Game Show Network | 257 | TNT | TNT (Turner Network Television) | 212 |
| THE HISTORY CHANNEL | The History Channel | 241 | USA | USA Network | 253 |

FIG. 7A

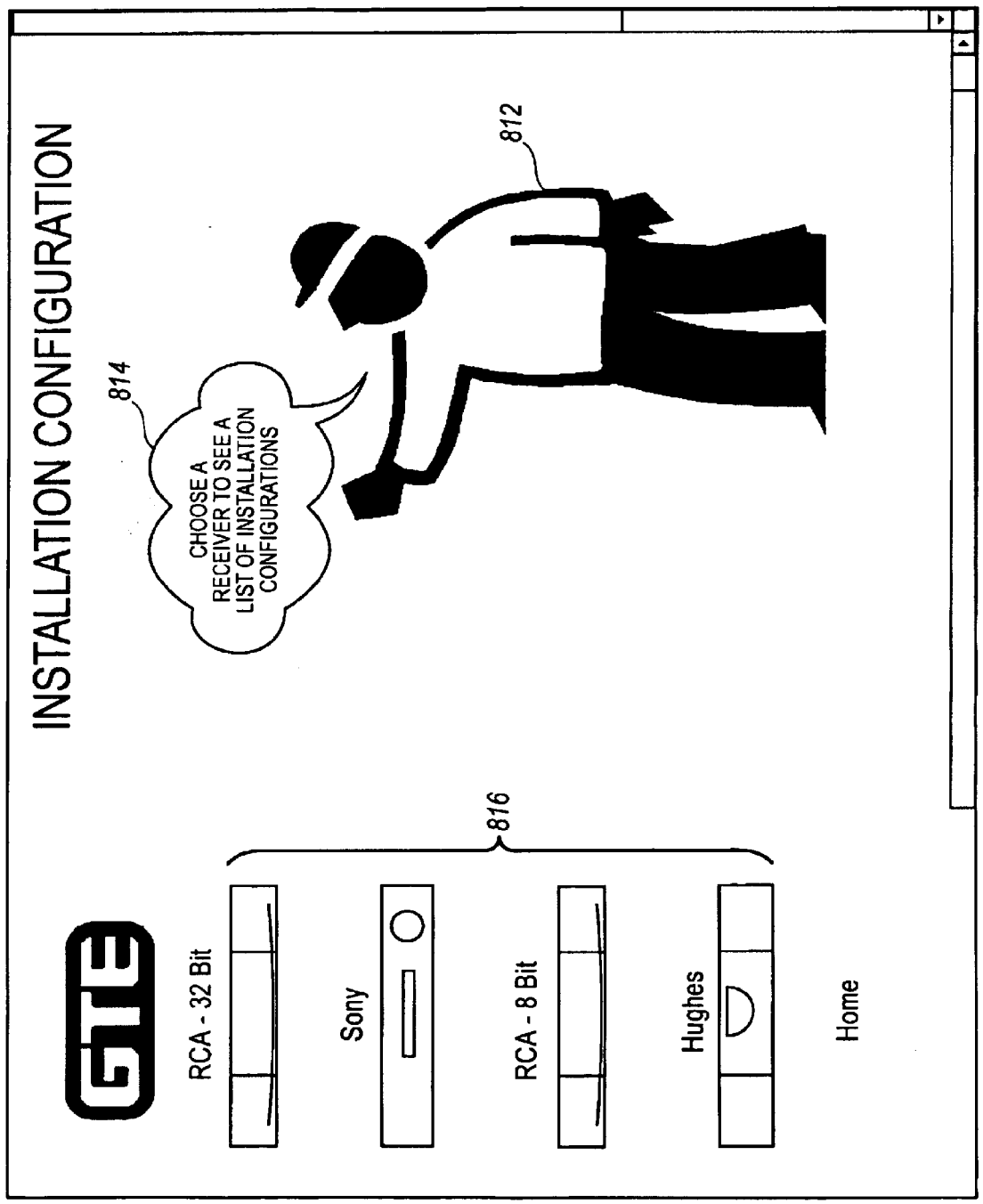

METHOD AND APPARATUS FOR PROVIDING WEB-BASED ASSISTANCE TO CUSTOMERS AND SERVICE REPRESENTATIVES

BACKGROUND OF THE INVENTION

1. Technical Field

The present invention relates to a method and apparatus for providing assistance to customer service representatives. Specifically, the preferred method comprises providing the assistance through a web-based application, wherein said application supplies the representative interactive video and information to assist in the diagnosis of customer's remote equipment and in the sale of products and services to the customer.

2. Description of Related Art

Many electronic systems are sold to consumers with the promise of telephone based 115 customer service to support that consumer. In other words, when the consumer buys an electronic device, he is also provided with a phone number he can call for assistance in using the device. For example, many homes have purchased satellite television systems. Once purchased, the satellite reception dish must be installed, the tuning box must be hooked between the satellite dish and the television, and service must be established. While this may have seemed easy to the consumer before making the purchase, he may need help with the tasks once he has gotten home.

Customer service operations are common for most large companies. Training customer service representatives is time consuming and expensive and retention for complex goods and services varies greatly amongst individuals. Especially when the underlying goods are complex, the average customer service representative can be easily confused by a consumer's questions. Such confusion leads to inaccurate advice being provided and ultimately to unhappy consumers. Further, for complicated devices such as satellite systems the average customer service representative cannot remember the many complexities encountered with different brands. Thus, a need exists for a method of assisting a consumer service representative by providing him/her with the needed information to assist a customer.

Many customer service operations use manuals to allow the representative to look up answers. However, the manuals can not be updated easily. Further, it may take longer than an impatient consumer can wait before the answer is found. Thus, a need exists for a method of providing frequently updated information to a representative.

Another function of the customer service representative is to sell the consumer services. To carry-on the satellite television example from above, the consumer buys the equipment, but then must also purchase service. This is accomplished by calling in to a central service center and placing the order. Service may come in many different packages, with one package focused on sports, while another may be focuses on movies, and yet another on educational programming. The pricing of each package may change frequently. Promotions may run, providing a discount to the purchaser of multiple packages and so forth. The multitude of options is difficult to track, and even more difficult to properly convey to the service representatives given the duty of making the sale and properly completing the order. Thus, a need exists for a method and apparatus for keeping the representative up-to-date on pricing plans and other information important to the consumer's purchase. In the same vein, disclaimers and other information concerning the consumer's rights or serviceability are often required. Ensuring that the representative provides this information each and every time he interacts with the consumer is very important. Thus, a need exists for a method of ensuring that the representative is provided with a script of necessary text to speak during his interaction with the consumer.

SUMMARY OF THE INVENTION

The present invention is a web-based application that assists customer service and sales representatives when dealing with customers by phone. In a preferred embodiment, the program is configured to specifically assist the representatives fielding calls regarding satellite systems, such as direct satellite service (DSS) receivers. The software tool allows the representative to screen a customer for serviceability, direct him to the nearest retail location, answer regional sports availibility, tailor an order to a customer's needs by simply asking a series of questions, or to easily diagnose specific problems encountered by the customer. It includes detailed information regarding each type of DSS receiver, as well as the numerous entertainment packages offered by DirectTV and USSB, the content providers. The tool can be implemented in retail locations to be use for sales aids, order taking, and technical assistance.

When the rep selects a model of DSS receiver on the tool's graphical user interface (GUI), he can rotate it to see the wiring ports on the back of the specific model. If a remote control is being discussed with a customer, the rep can click on any button on the representation of the remote and a dialog box will appear with predetermined text for the rep to use in discussing the problem with the customer. The image of a specific piece of equipment is active; i.e. if an actual DSS receiver has a red light that can blink, so does the display viewed by the rep. The program supplies a diagnosis "tree" for the rep to work down in diagnosing the problem encountered by the customer. The script supplied to the rep can be provided in English, a foreign language, and a phonetic representation of the foreign language script. For region specific programming on Regional Sports News (RSN), a customer can supply a zip code to the customer service rep who can then bring up the specific programming available for that area. The program provides specific scripts containing necessary disclaimers and legal tests that must be read to the customer. For order completion, a sales script is provided to the rep. As answers are supplied, an order completion form is completed. Specific prompts can be provided to guide the rep in selling promotionally priced programming. The answers to scripted questions can be used by the representative to recommend specific equipment to the customer.

For customers who have chosen to "self install" their satellite equipment, and run into difficulties, they can call a customer service agent for assistance. The agent will utilize the installation web application through as much of the installation as is required.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5, 5a and 5b illustrate screen displays for a first choice on the home page of FIG. 4;

FIG. 5c illustrates an exemplary SmartForm screen;

FIG. 5d illustrates an exemplary order form generated in response to information provided to the SmartForm;

FIGS. 6, 6a and 6b illustrate screen displays for a second choice on the home page of FIG. 4;

FIGS. 7, 7a and 7b illustrate screen displays for a third choice on the home page of FIG. 4; and FIGS. 8, 8a to 8f illustrate display screens for a fourth choice on the home page of FIG. 4.

DETAILED DESCRIPTION OF THE PREFERRED EMBODIMENT

Figure 1:
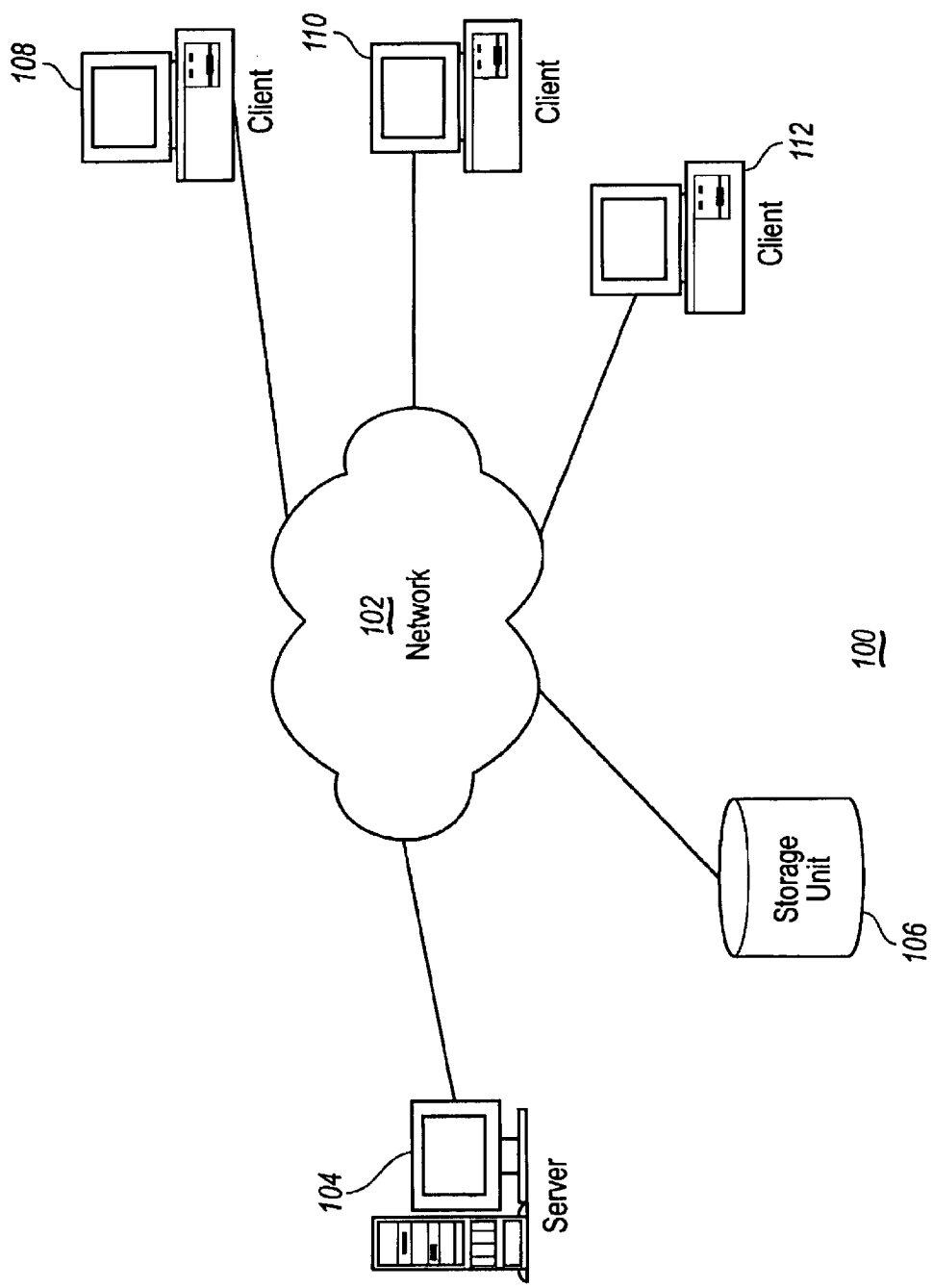
FIG. 1 depicts a pictorial representation of a distributed data processing system in which the present invention may be implemented.

With reference now to the figures, FIG. 1 depicts a pictorial representation of a distributed data processing system in which the present invention may be implemented.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the processes of the present invention.

Figure 2:
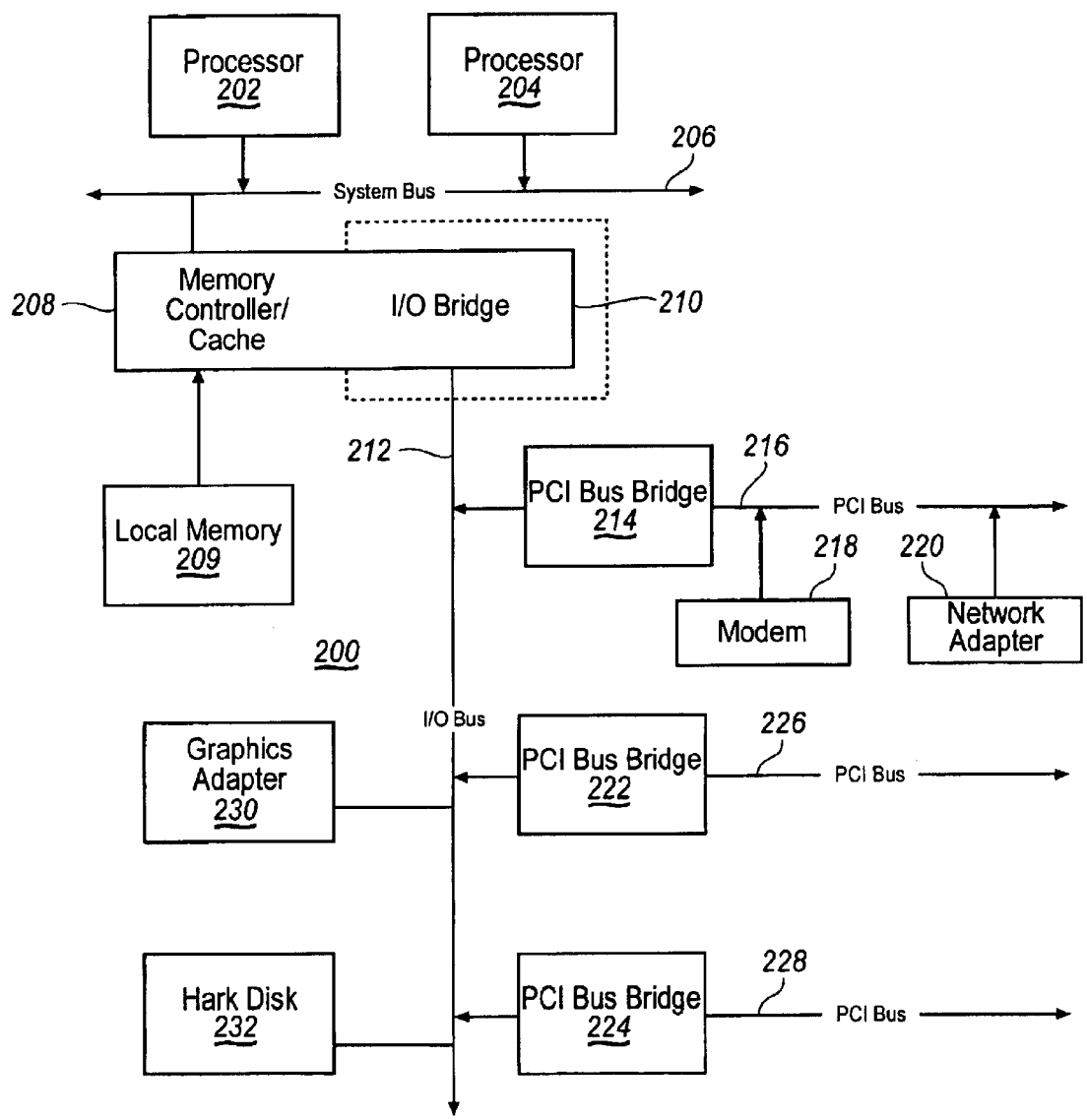
FIG. 2 is a block diagram depicting a data processing system, which may be implemented as a server in a distributed data processing system.

Referring to FIG. 2, a block diagram depicts a data processing system, which may be implemented as a server, such as server 104 in FIG. 1, in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
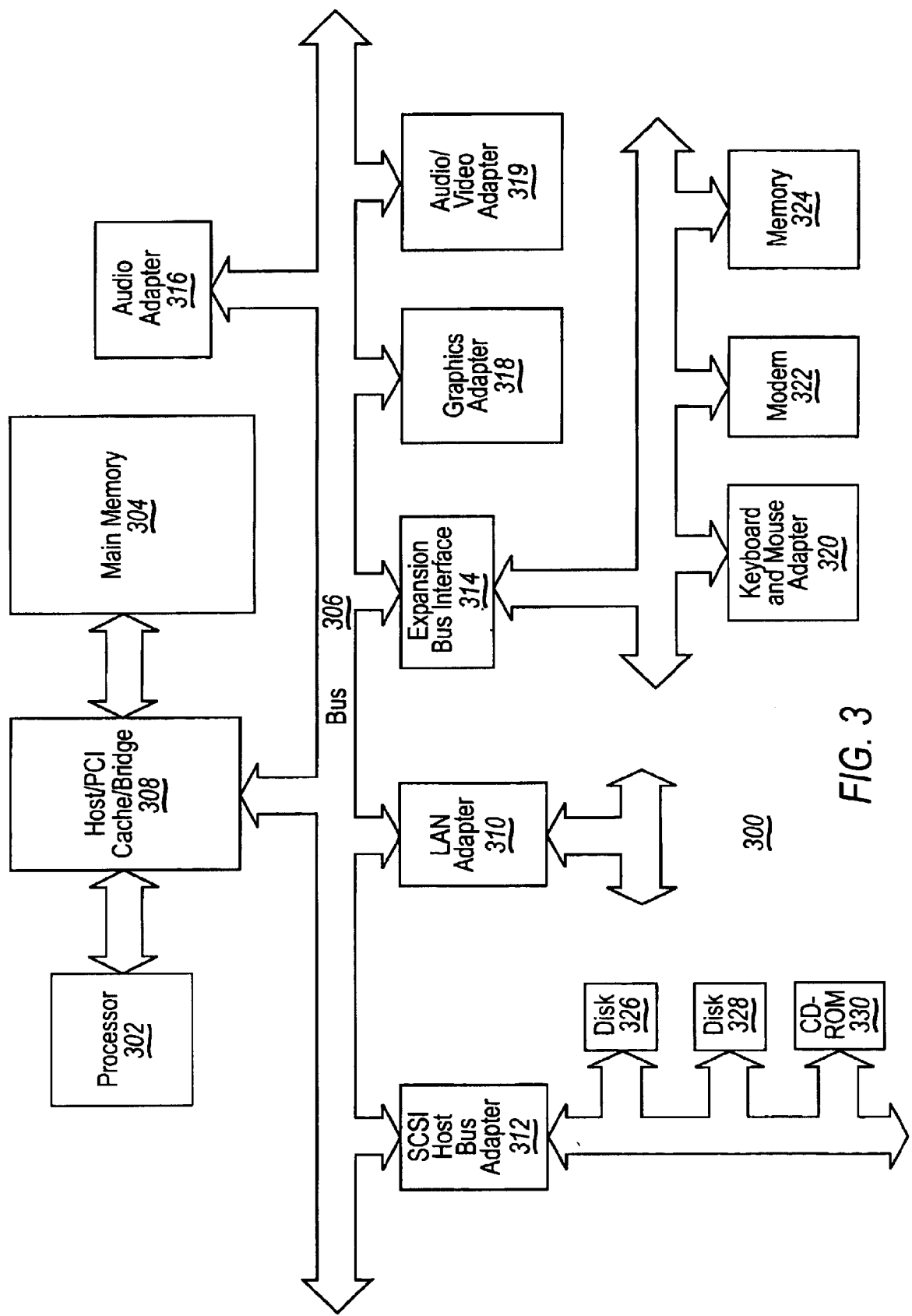
FIG. 3 is a block diagram illustrating a general data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and smart card adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors. Data processing system 300 could be connected through graphics adapter 318 to a computer display (not shown) and through smart card adapter 319 to a smart card reader (not shown).

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention.

Figure 4:
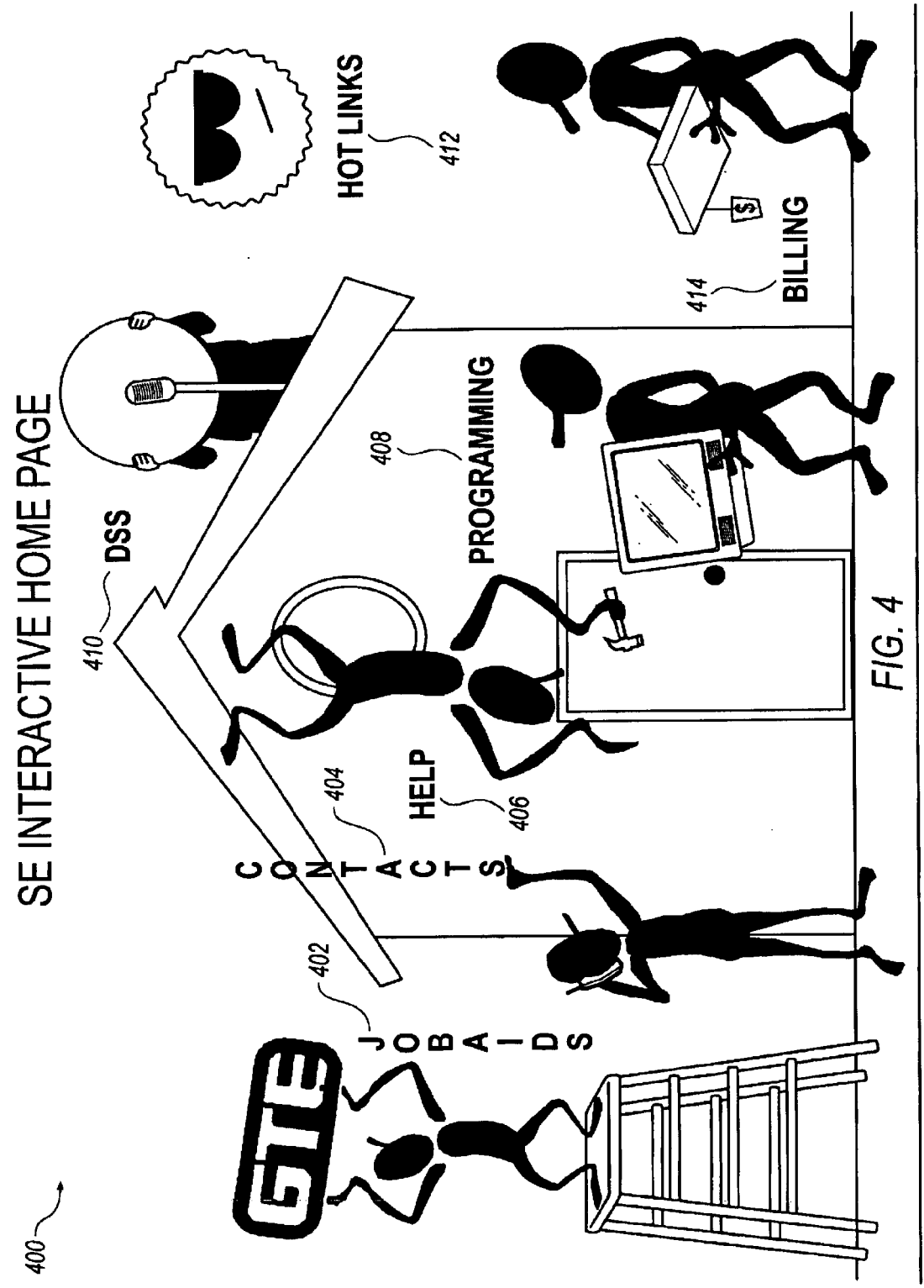
FIG. 4 is an illustration of the home page for the web-based application embodying the present invention.

FIG. 4 is a home page that could be used as the user interface of the present invention. As discussed above, the present invention can be implemented across a network or located on a stand-alone computer. The home page 400 comprises a set of options for a user. The options provided in this example are used in the instance that the invention is used to assist customer service representatives assessing a customer's needs with regards to a DSS satellite system. It should be emphasized that this is only an example, and that the underlying methodology could be applied in many situations. For example, the system could be used to assist a customer who has purchased a programmable phone, a home theatre audio system, a multi-media computer, or any other goods that require instructions. Likewise, the user may be a customer service representative or the end user who accesses this home page over a computer network. Likewise, the following system could be loaded on a computer readable medium such as a CD ROM, or magnetic disk.

The home page 400 has several options: job aids 402, contacts 404, help 406, programming 408, DSS 410, hot links 412, and billing 414. The overall layout of the home page may vary. For example, if the DSS system is installed in a multi-dwelling unit, additional options could be present on the home page to assist. However, in one embodiment, the images of actual customer service representatives are used to create moral among those representatives and to minimize any intimidation felt by those users who have little computer use experience. The home page acts as an entry point into an interconnected application that addresses the needs of the customer representative as well as the user. So, for example, entries in programming 408 can be used to fill out forms under contacts 404.

Figure 5:
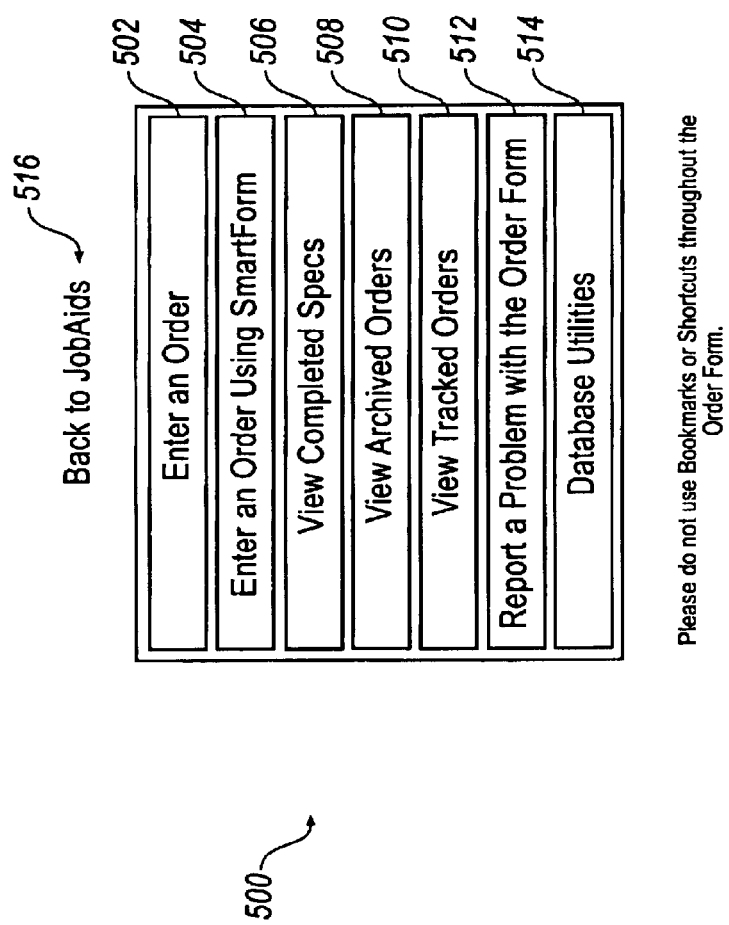

If Job Aids 402 is chosen, then an order entry screen 500 such as shown in FIG. 5, is displayed. The order entry screen 500 offers the user many options, including the ability to enter an order (step 502), enter an order using a SmartForm (step 504), view completed orders (step 506), view archived orders (step 508), view tracked orders (step 510), report a problem with the Order Form (step 512), or to choose from various database utilities (step 514). An option is also provided to return to the main home page (step 516).

An order form 518 is shown in FIG. 5a. The order entry form requests information on the name of the customer 520, his location 522, the name of the sales representative and other sales information 524. The display of FIG. 5a is used to gather initial customer data and to screen for serviceability. In other words, not all geographic areas are serviceable. Likewise, certain "blackout" rules affect the programming allowed for certain areas. The user's zip code can be used to screen for serviceability. Once entered, it can be used with a look-up table to determine serviceability. A response to a zip code search might be that the area is fully serviceable, drop ship only, future phase, NRTC, or not serviceable. Once serviceability is determined, a screen such as FIG. 5b is displayed.

If the user selects to use a SmartForm option 504, then a screen such as shown in FIG. 5c is displayed. The Smart Order Form 530 prompts the user to ask more qualitative questions about a customer's needs. For example, the customer might be asked the number of televisions that would be connected to the DSS system (step 532), or questions about viewing preferences (step 534), brand preferences (step 536) and so forth. Once the questions are answered, on order is automatically filled out, as shown in FIG. 5d, and can be reviewed with the customer. Automatic edits help to suggest equipment and installation options which not only best suit the customer's needs, but are also technically correct.

Figure 6:
Figure 6A:

FIG. 6 illustrates a screen displayed if the user selects the contacts option 404 on the home page. The screen 602 can provide numerous sources for information including important phone numbers 604, phone mart information 606, the Satellite Solutions Center 608, support requests 610, The National Support Center 612, and other options 614, 616, and 618. Of course the selection, arrangement and display of this information can be varied to match the needs of other configurations. If the user selects one of these options, then he is connected to other support pages. For example, if the phone mart information icon 606 is selected, then the screen 620 shown in FIG. 6a is shown. A Phone Mart or other sales location can be located for a potential customer or an existing customer in need of more personal attention. The location of the closest store can be determined by the customer's zip code 624, the store name 622 or the store's number 626. FIG. 6b provides a screen 630 that could be displayed once a store is selected. The user is supplied with information such as the store's address 632 and directions to the store. The facilities at the store 634 and methods of payment 636 and other useful information can also be displayed.

Figure 7:
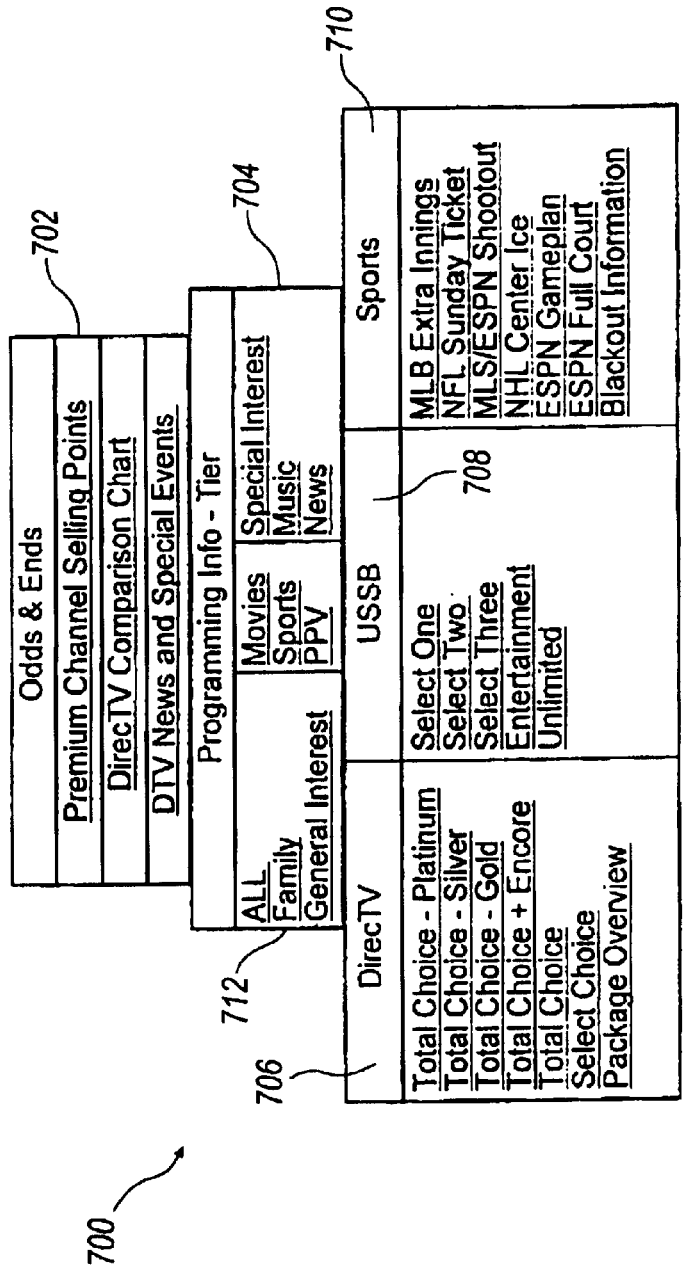
Figure 7B:
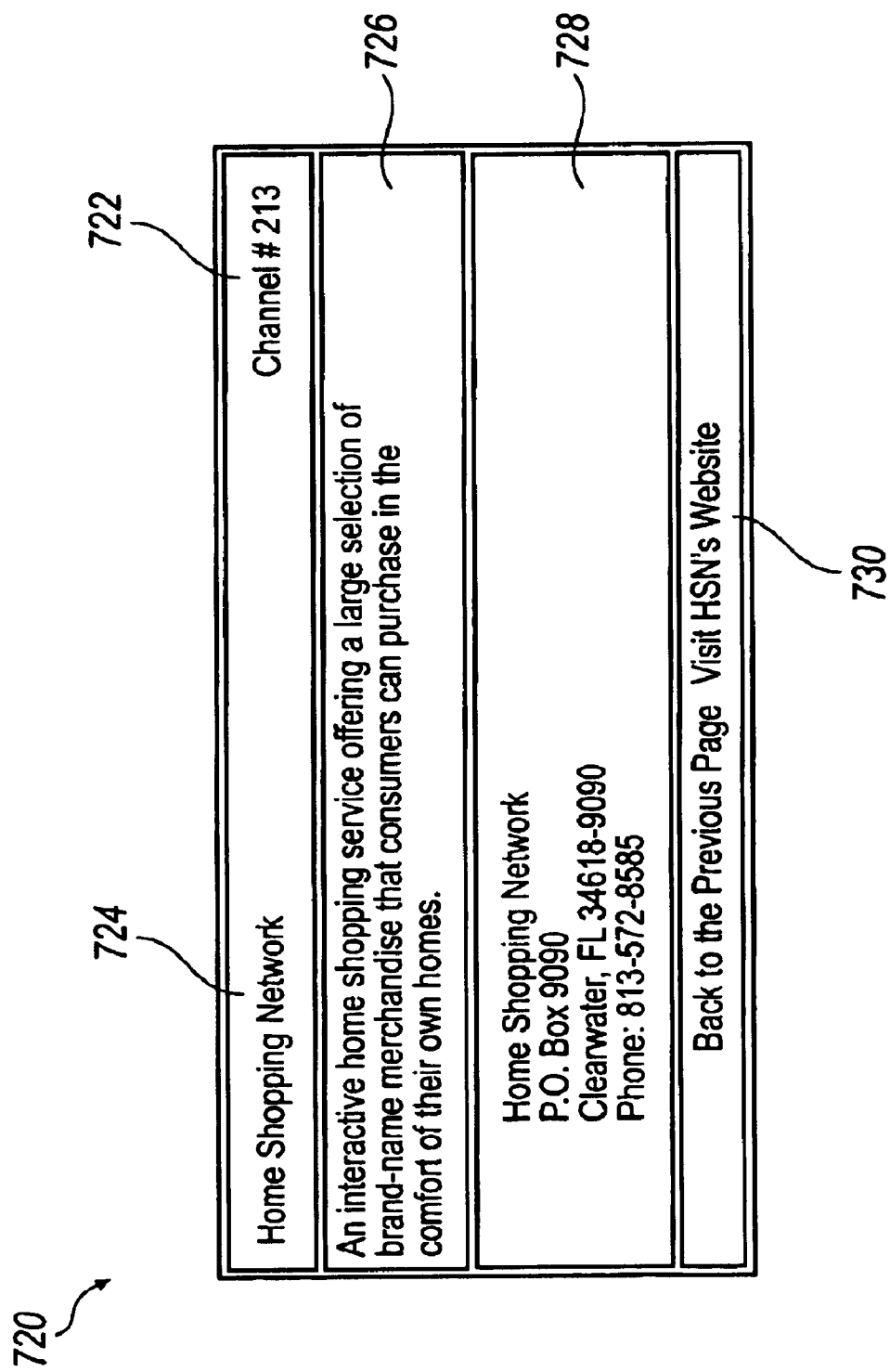

If the user selects Programming option 408 in FIG. 4, then a screen such as shown in FIG. 7 is displayed. The display 700 provides the user with information on a wide variety of programming options clustered in various groups. One group 702 could provide selling points to be used by the representative to encourage a customer to a order particular service. Another group 704 might cluster information according to the content of particular channels, such as family oriented viewing, sports oriented and so forth. The information can also be grouped according to provider, such as DirecTV 706, USSB 708, or by special package 710. If the user selects any item in the list, another display is provided with additional information. For example, if the user selected General Interest 712 under the programming information tier 704, then a second layer of information is displayed such as illustrated in FIG. 7a. The General Interest lineup can include multiple channel listings. These can be displayed in column format with the channel's logo 714, the channel name 716, and the channel designation 718. If the user then selects a particular channel, a third layer of information is provided on that particular channel. For example, if the Home Shopping Network 720 is chosen, then the display of FIG. 7b is provided. Additional information on that channel could include its name 724, its channel designation 722, a brief description of its content 726, and its mailing address and phone number 728. As with all of the pages described, the user is also given the option of returning to the previous page, and in this case, visiting the channel content provider's home page 730. In other words, an active link can be placed within the various pages of the present invention.

Figure 8:
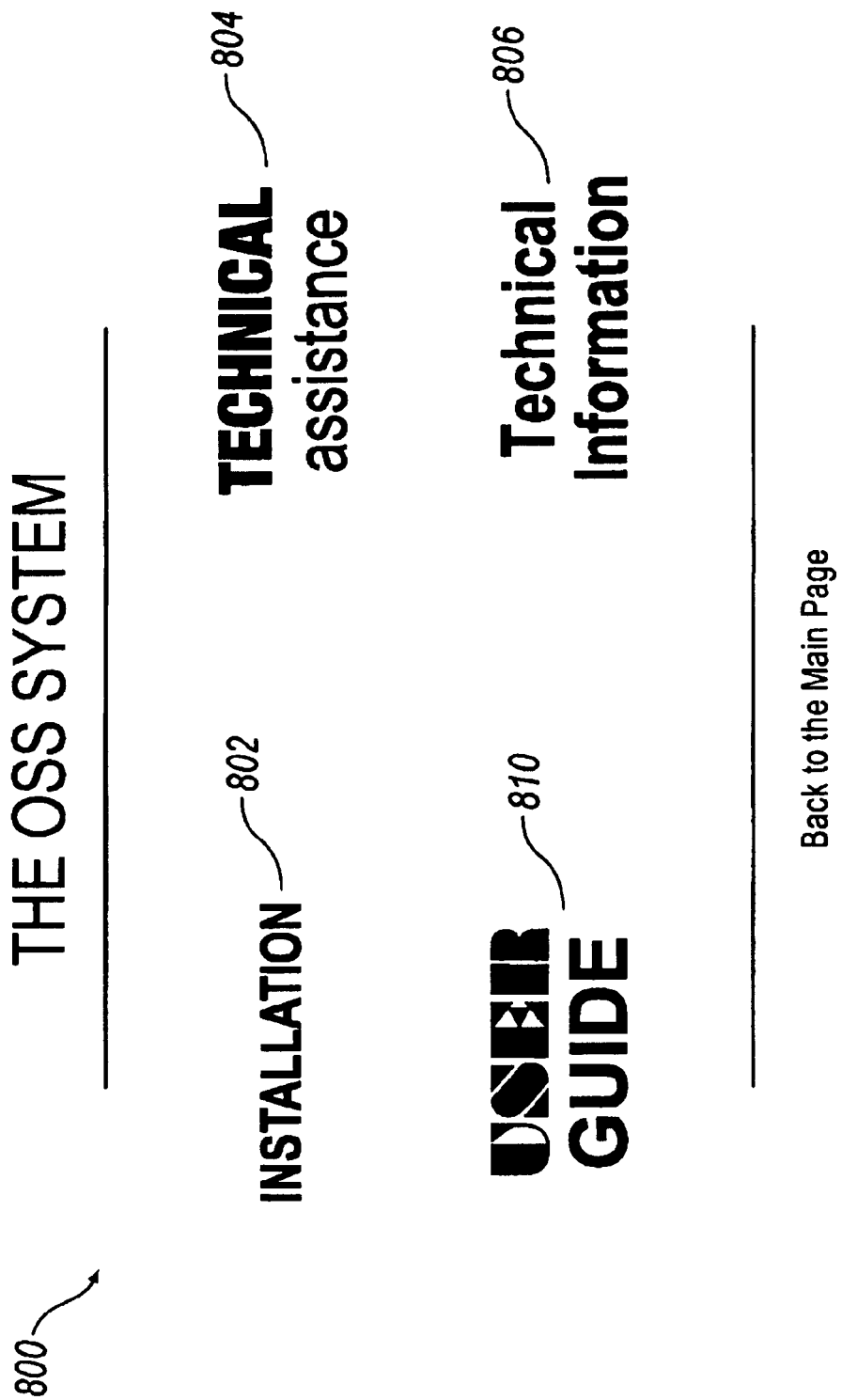
Figure 8B:
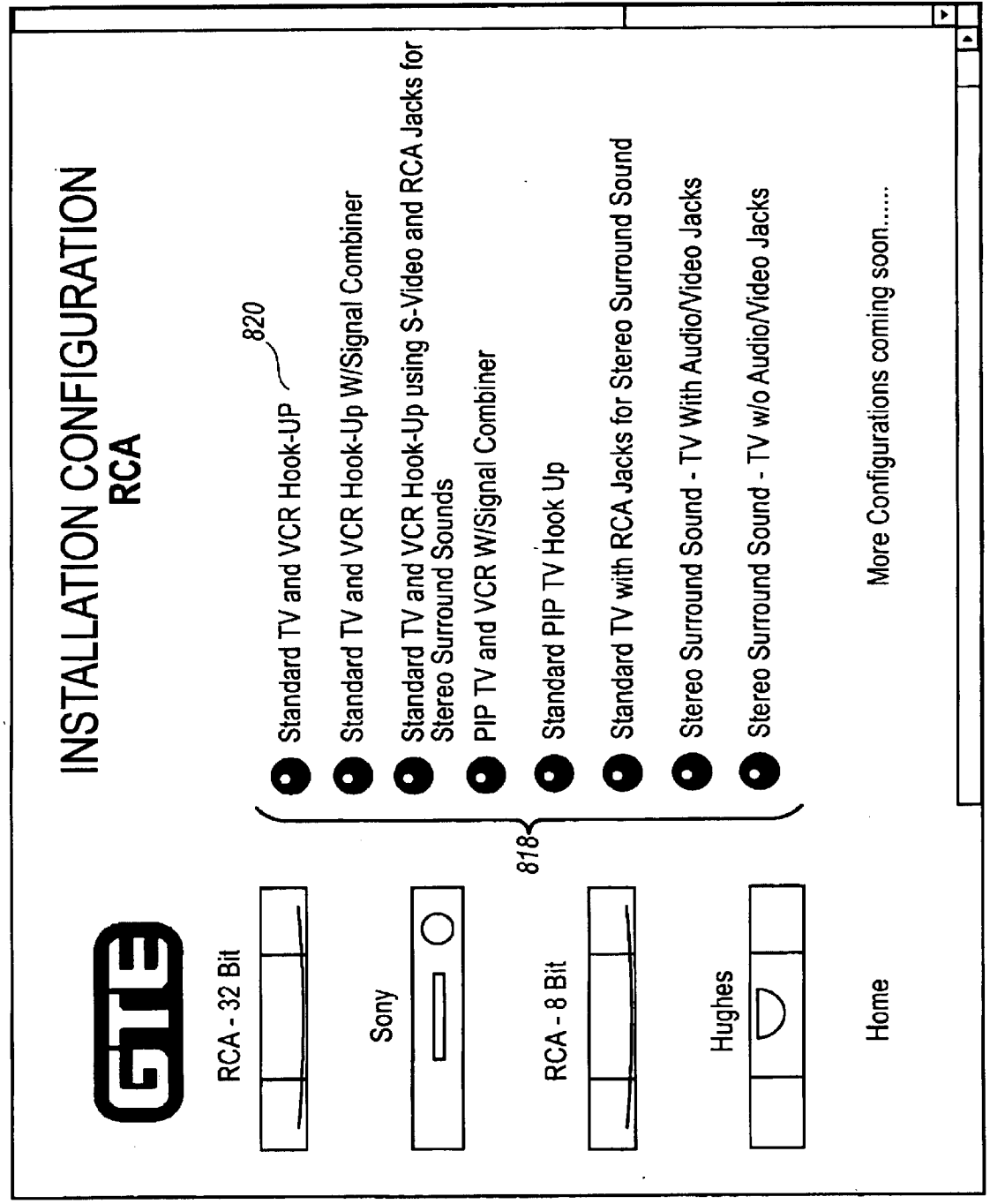

FIG. 8 illustrates a display provided to a user when the user selects the DSS option 410 on FIG. 4. The initial display 800 provides the user with options on installation 802, technical assistance 804, technical information 806 and a user guide 810. If installation 802 is selected, a new display is provided with a FIG. 812 asking the user to select a model of receiver to install. Dialog is provided in a dialog bubble 814. Selections 816 are graphical. Thus, the representative can describe the appearance of a particular unit to a customer, if the customer does not know the exact model he owns. Each receiver selection is linked to additional pages of information. For example, if an RCA brand receiver is chosen, then a display such as the one shown in FIG. 8b is shown. It provides a chart of various installation options including a standard TV and VCR hook-up 820.

Figure 8C:
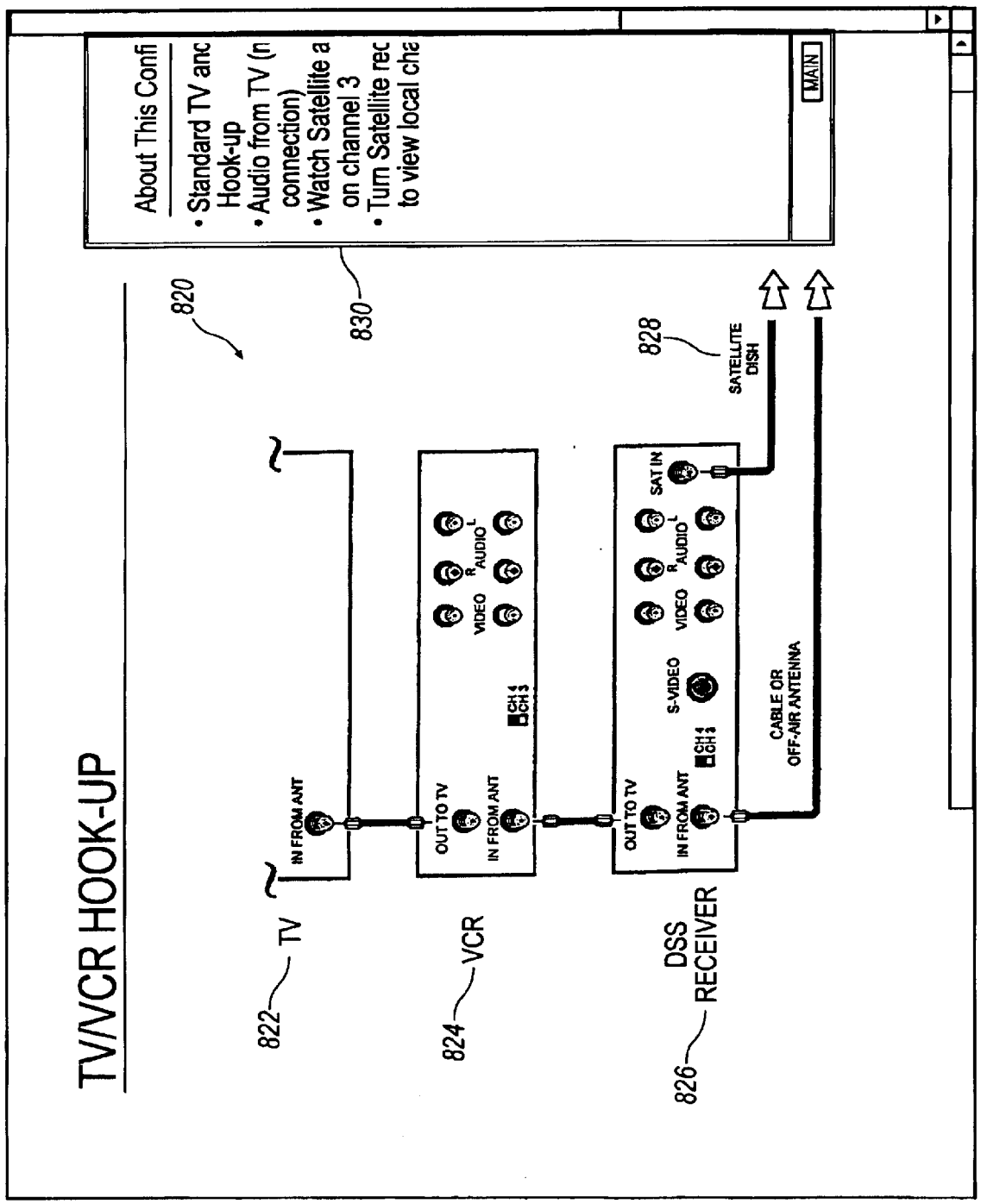
Figure 8D:
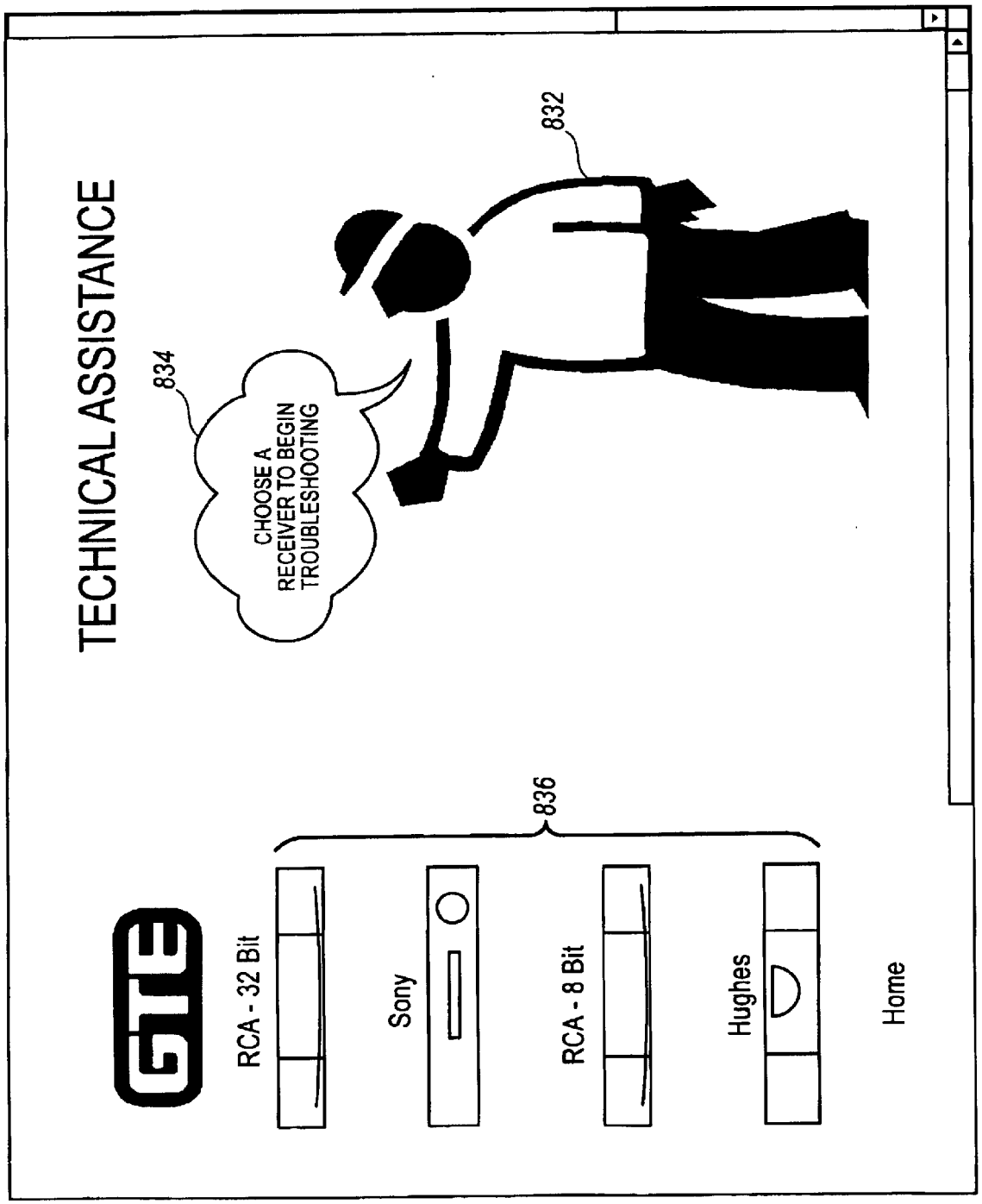
Figure 8E:
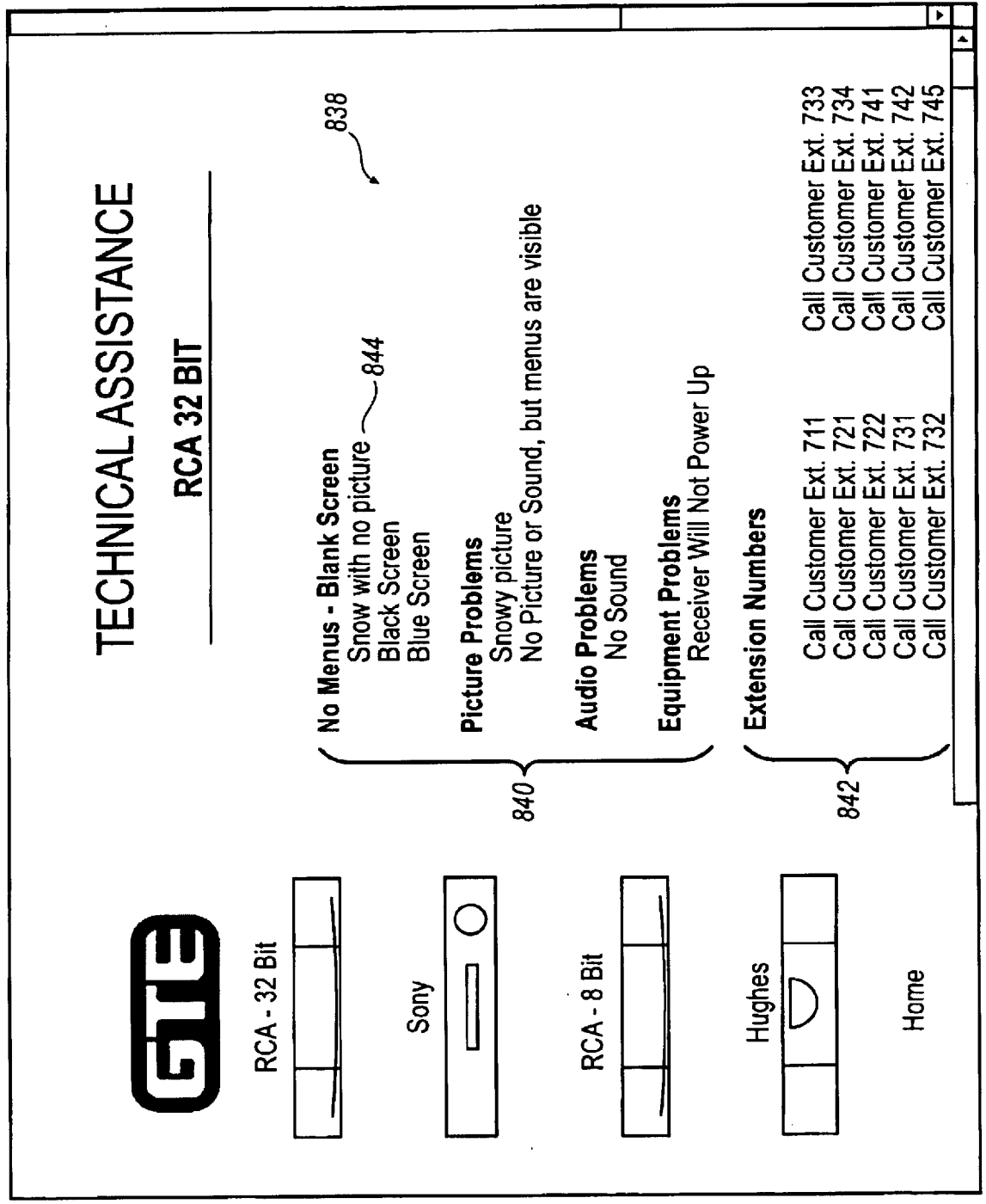
Figure 8F:
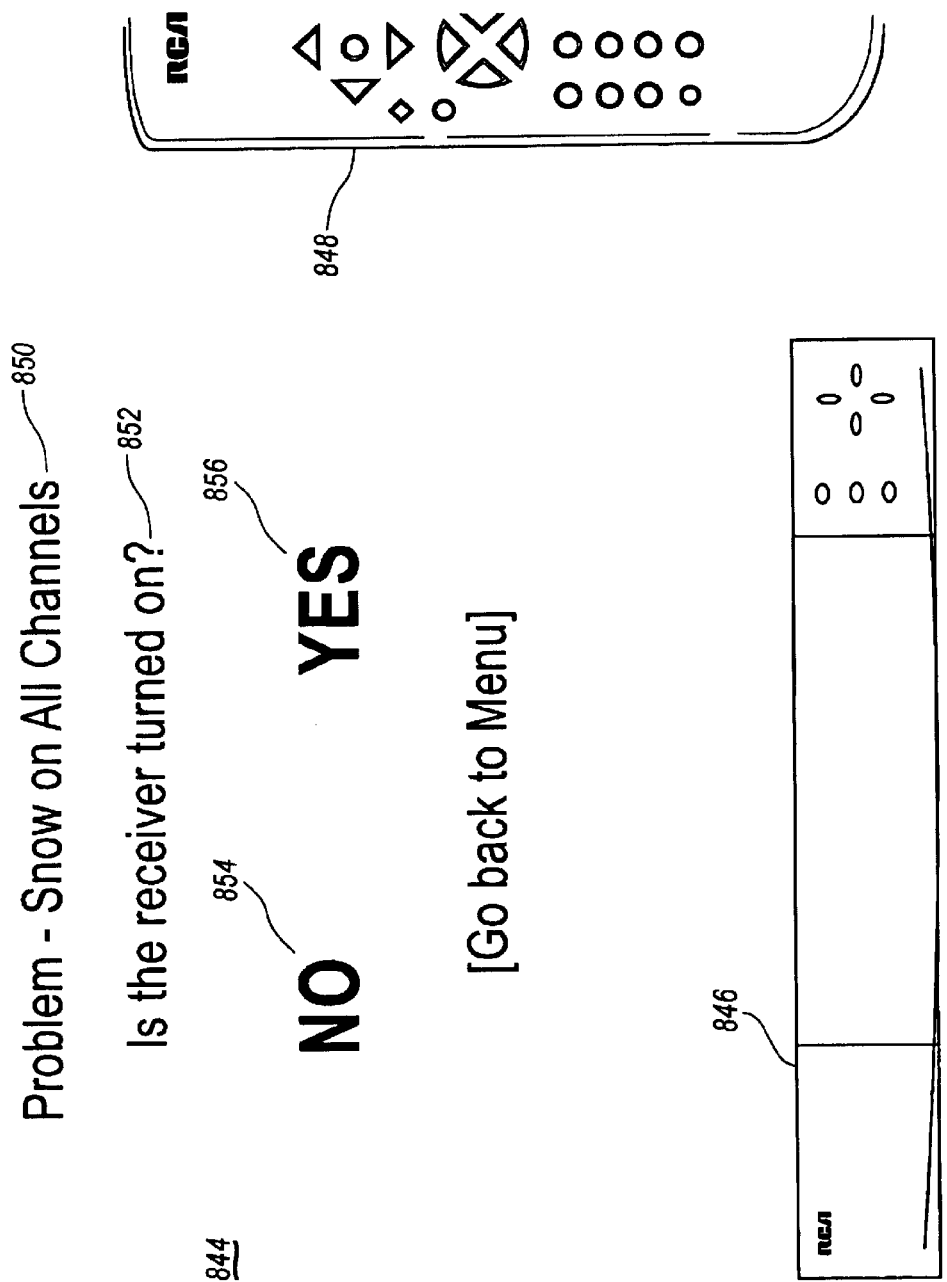

If the user wants more information on any option, each option is linked to a graphical page, FIG. 8c, that shows the connection panels for the various components. For example, if a TV 822 is connected to a VCR 824 and a DSS audio receiver 826, the rear panels for each are shown. Cables 828 are shown between the appropriate inputs and outputs. An additional dialog box 830 is provided with an explanation of the installation. In one embodiment, the picture of the chosen receiver can be rotated within the display, thereby improving the user's spatial understanding Technical assistance 804 can also provide the user with a display, FIG. 8d, containing an individual 832 asking the user to choose a particular receiver. Dialog can be shown in a dialog bubble 834. The various receiver 836 choices are also shown graphically. The use of these graphics makes the interface less intimidating and thus more effective. Once a receiver is chosen, another screen 838, FIG. 8e, is provided with a list of trouble shooting questions 840, and other phone numbers 842. The trouble shooting questions can be sequentially chosen to determine the nature of any trouble. For example, if the television is only having "snow" rather than a picture, that question 844 can be selected. Another set of questions is then available to help the customer service representative walk the customer through a solution to that problem. The display 844, FIG. 8f, provides a first question to ask the customer. For example, the representative might ask if the receiver is turned on 850. Choices for "yes" 856 and "no" 854 are also linked to additional pages. If "no" is selected, then additional pages are provided with follow-up questions. The page 844 can also include provide illustration of the selected receiver 846 and its remote control 848. In one embodiment, the illustrations of the receiver and remote control are active. In other words, if the user selects a button on the remote control with a pointing device, then a dialog box can appear with additional information about the function of that particular button. Additionally, if the remote control activates a function or a light on the receiver, that light will appear on the displayed receiver when selected on the displayed remote.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product on a computer readable medium for use in providing assistance and order completion to a user when serving a customer, comprising:
   (a) a graphical user interface having a home page and a plurality of additional pages including an order entry page for the customer's order; and
   (b) a set of queries for the user to ask the customer, the responses to which are entered by the user and are used to automatically populate the order entry page.

2. The computer program product of claim 1 further comprises:
   (c) a query regarding a zip code for a service;
   (d) look-up means for determining if said zip code is a serviceable area.

3. The computer program product of claim 1 further comprises:
   (c) a query regarding a zip code for service;
   (d) look-up means for determining a program package available for said the zip code provided in response to (c).

4. The computer program product of claim 1 further comprises:
   (c) a script of required text for the user to read to the customer.

5. The computer program product of claim 1 further comprises:
   (c) means for tracking a completed order.

6. The computer program product of claim 1 further comprises:

(c) means for archiving a completed order.

7. The computer program product of claim 1 wherein said program product is executable on a stand-alone computer.

8. The computer program product of claim 1 wherein said program product is executable on a computer network.

9. A computer program product on a computer readable medium for use in providing assistance and order completion to a user comprising:

(a) a query for a model of set-top box for which the user needs assistance;

(b) means for displaying the set-top box selected in response to (a); and (c) means for interrogating the display of said selected set-top box.

10. The computer program product of claim 9 wherein said means for interrogating said display comprises means for simulating the functionality of said box.

11. The computer program product of claim 9 wherein said means for interrogating said display comprises means for rotating the display of the box to view an alternate perspective of the box.

12. The computer program product of claim 9 wherein said program product is executable on a stand-alone computer.

13. The computer program product of claim 9 wherein said program product is executable on a computer network.

14. A method of providing a device simulation using a computer based application, wherein said simulation aids a user, said method comprising the steps of:

(a) displaying the device;

(b) interrogating the device in response to a user's command; and (c) displaying a dialog box, which is separate from the device, in response to said interrogation, wherein the dialog box contains a useful description of the results of the interrogation, said displaying a dialog box further including:

displaying at least one question to diagnose the device.

15. The method of claim 14 wherein the device comprises a set-top box.

16. The method of claim 15 wherein step (b) further comprises introducing a command simulation to said displayed set-top box and receiving an output substantially matching the output of an actual set-top box.

17. The method of claim 14 wherein step (b) comprises interrogating a remote control.

18. The method of claim 15 wherein step (b) further comprises rotating the display of the set-top box to view an alternate perspective of the box.

19. The computer program product of claim 9, further comprising:

(d) means for displaying a series of questions to aid the user in troubleshooting the set-top box.

* * * * *